March 21, 1939.  F. J. SHOOK  2,151,306
TIRE BEAD WINDING APPARATUS
Filed Dec. 23, 1937  4 Sheets-Sheet 3

INVENTOR
FLORAIN J. SHOOK
BY Albert R. Ely
ATTORNEY

Patented Mar. 21, 1939

2,151,306

UNITED STATES PATENT OFFICE 2,151,306

TIRE BEAD WINDING APPARATUS

Florian J. Shook, Akron, Ohio, assignor to National-Standard Company, Niles, Mich., a corporation of Michigan Application December 23, 1937, Serial No. 181,377

8 Claims. (Cl. 154—9)

This invention relates to tire bead winding apparatus, and more especially it relates to improved apparatus for winding rubberized wire tape into a plurality of superposed convolutions in the manufacture of inextensible bead cores for use in pneumatic tire casings.

The invention is an improvement upon the apparatus constituting the subject matter of the inventor's prior Patent No. 2,083,350, issued June 8, 1937.

The apparatus of the patent aforesaid is adapted to manufacture bead cores of various number of convolutions, and is adjustable so that the respective ends of the tape, of which the bead core is constructed, may be caused to overlap each other anywhere from 3 inches to 9 inches as desired. Improved tire building practice and improved rubber compositions now have made such extensive overlap of the tape-ends unnecessary and undesirable, it being found that an overlap of ⅜ inch to ¾ inch is sufficient. Such beads cannot be produced by apparatus constructed according to the aforesaid patent.

The chief object of the invention is to provide apparatus for the winding of bead cores of the character mentioned with relatively little overlap of the tape-ends. More specifically the invention is an improvement upon and an addition to the apparatus of the aforesaid patent whereby said apparatus is enabled to accomplish the aforesaid object. Other objects will be manifest as the specification proceeds.

Of the accompanying drawings:

Figure 7 is a section on the line 7—7 of Fig. 6.

Figure 1:
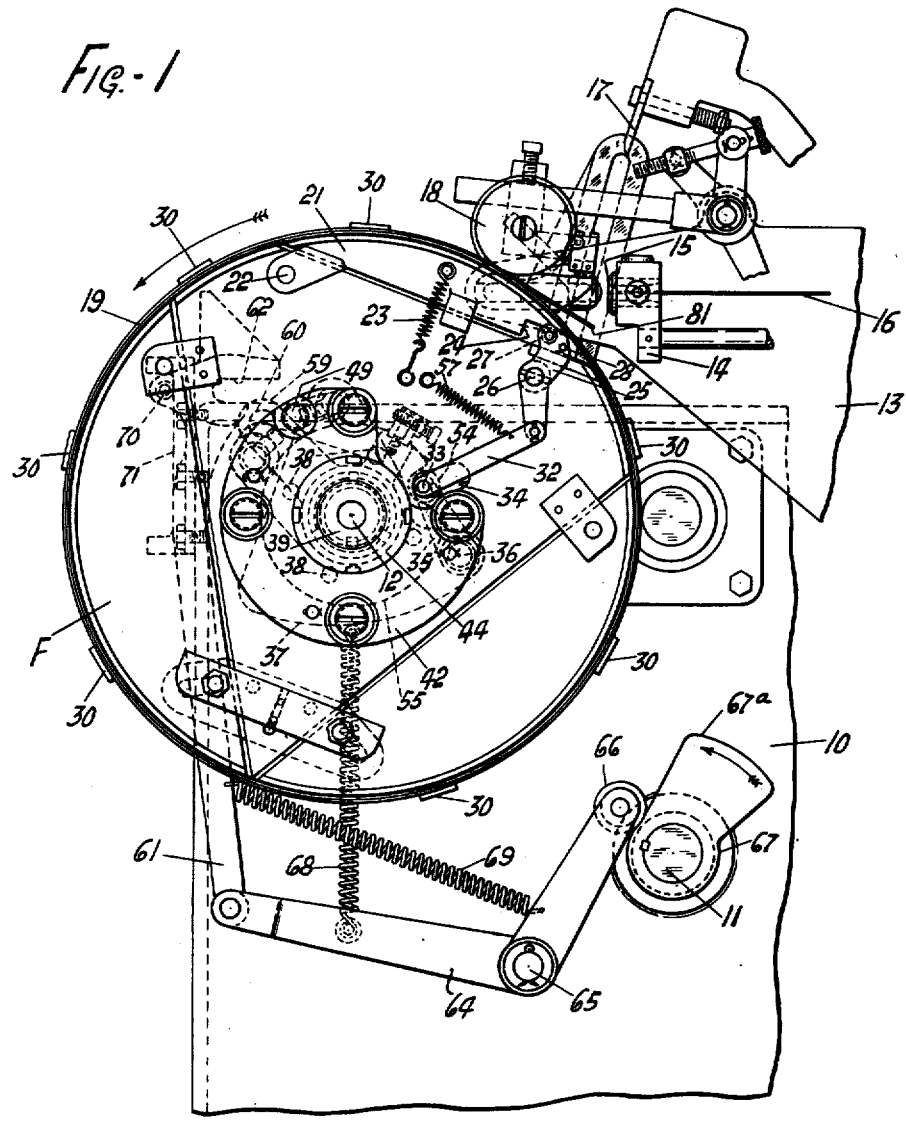
Figure 1 is a fragmentary front elevation of bead winding apparatus embodying the invention, and the work therein, showing the form on which the bead-tape is wound in the position it occupies initially when stopped to permit severing of the bead-tape.
Figure 2:
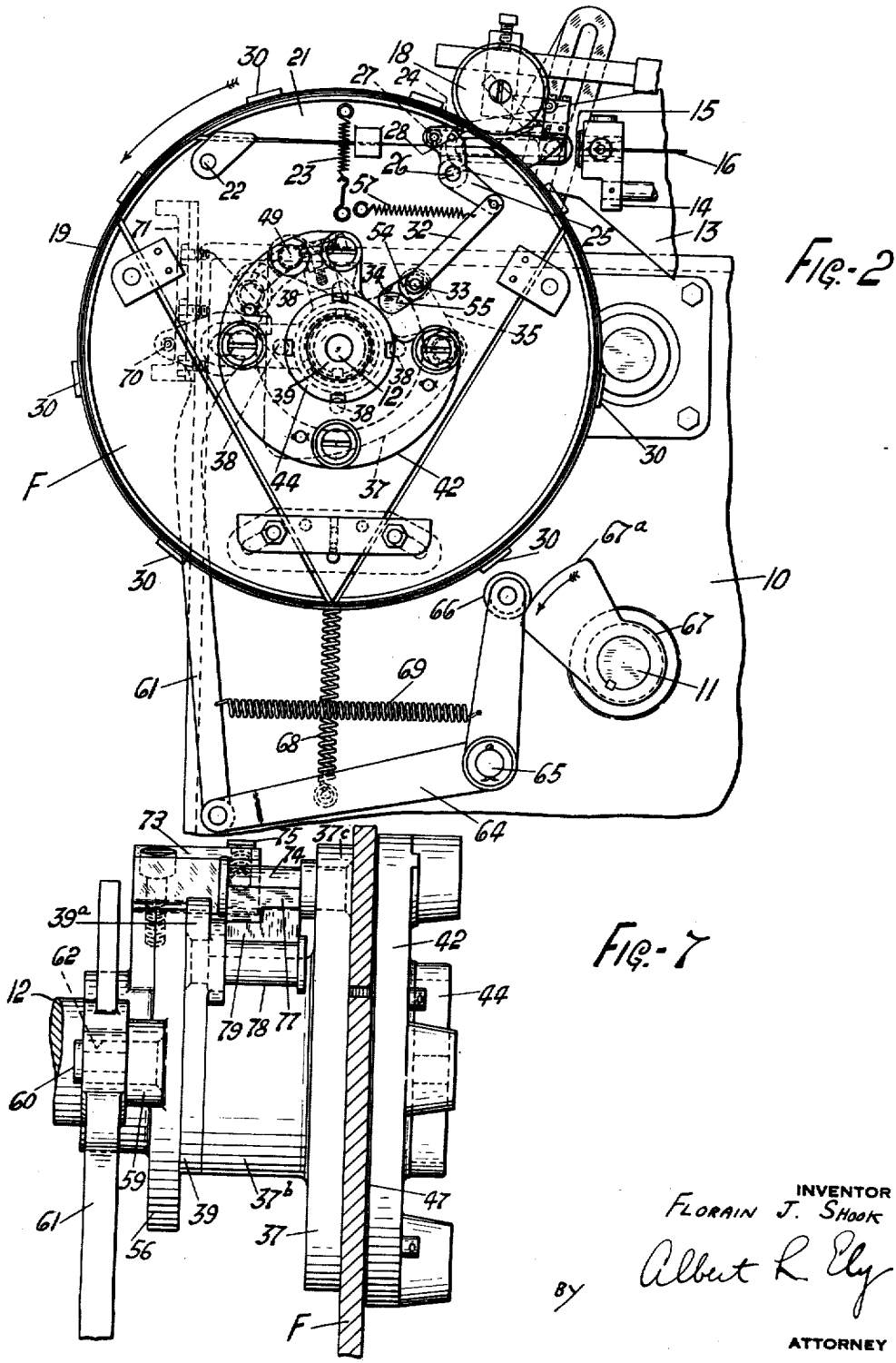
Figure 2 is a view of the structure shown in Fig. 1 at an immediately subsequent phase of operation, the form being advanced angularly a determinate distance, in which position the finished work is ejected from the form and the leading end of the tape fed forwardly thereto, while the form is stationary.

Referring to Figs. 1 and 2 of the drawings, there is shown a portion of the housing 10 of the apparatus, from the front wall of which housing projects a cam and crank shaft 11 and a form-supporting shaft 12, the latter being driven by shaft 11 through the agency of mechanism clearly shown in my prior U. S. patent aforementioned. The shaft 11 rotates continuously while the apparatus is in operation, and makes one complete revolution during one operative cycle. The shaft 12 has a stationary phase and a rotative phase during each operative cycle, and the number of revolutions during its rotative phase may be varied selectively according to the number of convolutions of tape to be wound into each bead core. The shaft 12 carries a form, generally designated F, upon the perimeter of which the rubberized wire tape is wound, said form being of the partly collapsible type substantially as shown in my prior U. S. Patent No. 2,115,450, issued April 26, 1938. At 13 is shown a portion of a generally triangular framework that is adjustably mounted upon the housing 10. Said framework carries tape-severing means, and to this end is formed with a bracket 14 in which is mounted a transversely slotted die 15 through which the bead-tape passes, said tape being designated 16. Co-operating with the die 15, for the severing of the tape, is a blade 17 that is normally disposed in elevated position, and at the proper time, with relation to the operation of the form F, is caused to descend in an arcuate course across the front face of the die and thus to shear the tape extending therethrough. The said blade is retracted from in front of the die immediately the tape is severed. Also supported from the framework 13 is a presser roller 18 that is yieldingly urged toward the periphery of form F, to compact the plies of the bead core structure thereon, said bead core structure being designated 19 and consisting of a plurality of convolutions of the rubberized tape 16.

The form F is a disc-like structure, and comprises a chordal segment 21 of relatively small area as compared to the area of the disc, said chordal segment being pivotally connected at one of its ends to the major form structure, as shown at 22. The segment 21 is spaced from the major form structure when the form is expanded to its operative circumference, as shown in Fig. 1, but may be rocked on its pivot 22 to contract the circumference of the form, as shown in Fig. 2, when a completed bead core 19 is to be removed from the form. A tension spring 23 normally urges the free end of the segment 21 toward the major form structure. At the free end of the segment 21, between the latter and the major form structure, is an enlarged, non-radial recess 24 wherein is positioned means for lifting the said segment against the tension of spring 23, and means for gripping the leading end of the tape 16 so that the latter will be drawn onto the form when the form rotates. To this end an angular lever arm 25 is pivoted at its middle upon the major form structure at 26 and has one free end provided with a transversely disposed roller 27 and transversely disposed metal pin 28, the latter being polygonal in cross section, said roller and pin being positioned within the said recess 24. When the lever arm 25 is in the angular position shown in Fig. 1 of the drawings, the roller 27 is in engagement with form segment 21 and holds the free end thereof away from the major form structure against the pull of spring 23, and the pin 28 bears against the leading end portion of tape 16 and grips the latter between itself and the margin of the major form structure, at the bottom of recess 24. When the lever arm 25 is in the position shown in Fig. 2, the roller 27 is retracted sufficiently to permit spring 23 to pull segment 21 toward the major form structure and thus to contract the circumference of the form, and pin 28 is lifted from the leading end portion of the tape 16 so that the completed bead core 19 may be ejected from the form. Ejector fingers 30, 30 are positioned about the perimeter of the form and are movable across said perimeter to eject the bead core from the form, suitable means (not shown) being provided for effecting operation of said ejector fingers.

For turning the lever arm 25 angularly upon its pivot 26, the end thereof remote from the roller 27 is pivotally connected to one end of a link 32, the other end of said link being pivotally connected to a pin 33 that extends through the form, from the rear thereof, through a radial slot 34 in said form. The pin 33 is carried in the free ends of a pair of arms, such as the arm 35, that are pivotally mounted at 36 upon a bracket-like formation 37a projecting radially from an adapter 37. The latter fits against the rear face of the form F, and is provided with a plurality of forwardly extending dowels 38, 38 that fit within respective apertures in the said form F, but do not project through the latter. The adapter 37 is formed with an axial hub portion 37b, and is journaled upon an adapter sleeve 39 that is mounted upon a reduced forward end portion of the shaft 12 and secured against angular movement relative thereto by means of key 40. The arrangement is such that the form F and adapter 37 may move angularly relatively of the adapter sleeve 39 and shaft 12.

For retaining the form F upon the adapter 37 and for driving said form and adapter when the shaft 12 is rotated, there is provided a driver plate 42 that is mounted upon the front end portion of adapter sleeve 39, in slightly spaced relation to the front of form F, and secured against rotation relatively of the adapter sleeve by means of keys 43, 43, the driver plate being retained on the adapter sleeve by means of a nut 44. As shown in Figs. 1 and 2, the driver plate 42 is generally circular in plan except that one portion of its periphery is formed with a deep re-entrant so as to expose the slot 34 in the form and to permit operation of the mechanism projecting through said slot. The rear face of the driver plate is formed with an arcuate concentric recess 45 of substantially 270° in extent, and mounted in said recess is an arcuate pressure plate 46 having a facing of frictional material 47, such as brakelining. The pressure plate 46 is backed by a plurality of compression springs 48, 48, carried by the driver plate, which springs yieldingly urge the facing 47 of the pressure plate into frictional engagement with the front face of the form F. The driver plate 42 also carries a driving stud 49 that projects rearwardly therefrom into a local arcuate slot 50 in the form F, said slot being concentric with the axis of said form. The arrangement is such as to permit the form F to be turned angularly, relatively of the driver plate 42, to provide lost motion between the form and the shaft 12, as subsequently will be explained.

The pin 33 previously mentioned extends rearwardly from the arms 35, and at its rear end carries a cam roller 54 that rides upon the perimeter of a cam surface 55 formed upon a wrist plate 56, the latter being journaled upon the shaft 12, immediately behind the adapter sleeve 39. As is best shown in Figs. 5 and 6, the cam surface 55 is formed with a single depression 55a that is abrupt on one side and sloped on its other side, and during the winding of a bead core the cam roller 54 is positioned in said depression, being urged thereinto by a tension spring 57, Figs. 1 and 2, that is connected to link 32 and to a fixed point on form F, in which position of the parts the gripper pin 28 is holding the leading end of tape 16 and roller 27 is holding form-segment 21 in elevated position with relation to the major form structure.

Figure 5:
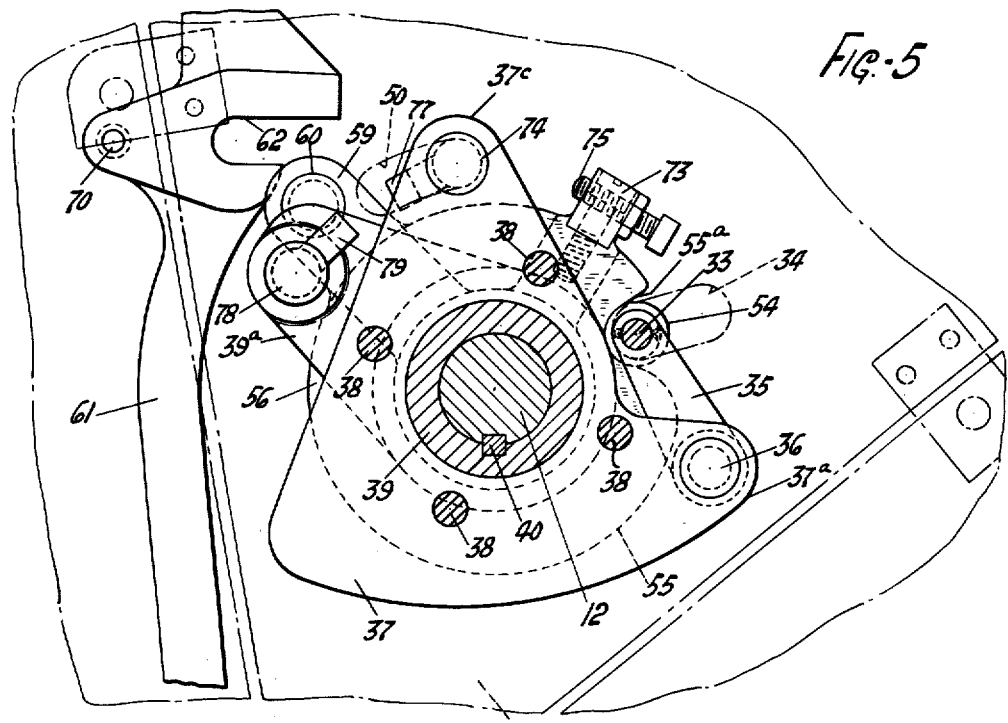
Figure 5 is a section on the line 5—5 of Fig. 4.
Figure 6:
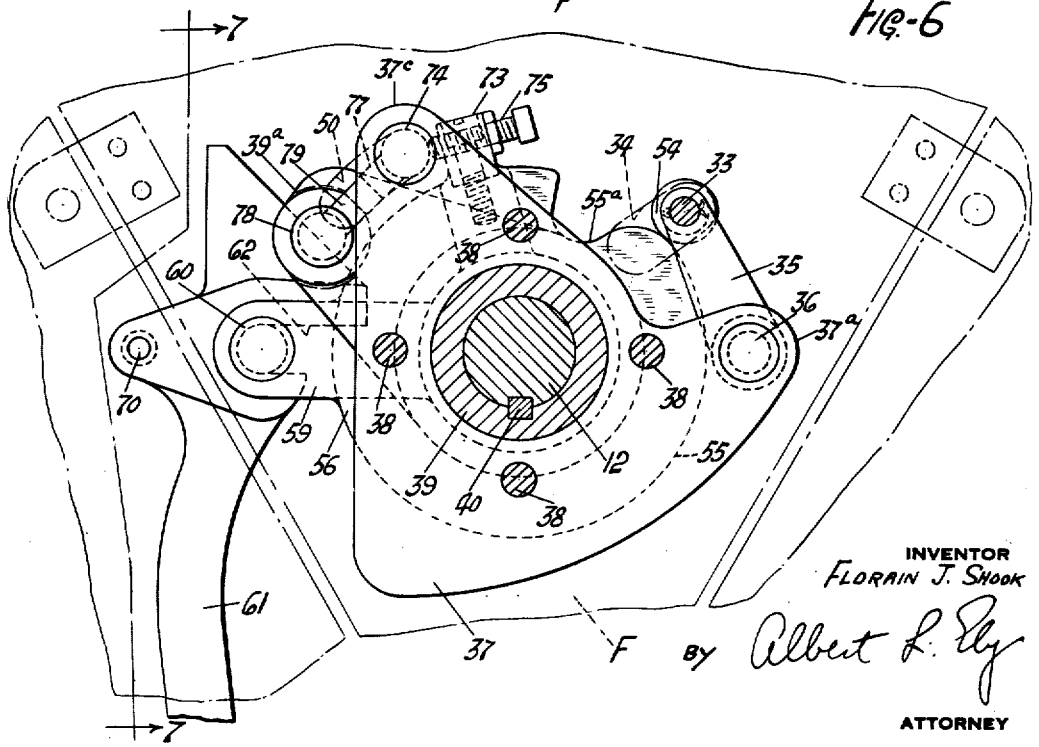
Figure 6 is a sectional view similar to Fig. 5 but with the parts in the positions they occupy in Figure 2.

During the intervals that the form is stationary, the cam surface 55 is moved angularly with relation to the form F, counter-clockwise as viewed in Figs. 5 and 6, to operate the lever arm 25 and thus to release the leading end of the bead tape 16, and to effect collapse or retraction of the form segment 21, such movement of the cam and wrist plate being possible by reason of the wrist plate being journaled on shaft 12. For so turning said wrist plate, the latter is formed with a radial arm 59 having its free end provided with a rearwardly extending stud 60, that projects into the path of the hooked upper end portion of a vertically movable operating member 61. The hooked end of member 61 comprises a horizontal slot 62 into which the stud 60 moves when engaged by the overhanging lip of said slot, in the downward movement of said member 61. The extent of said downward movement of member 61 is sufficient to turn wrist plate 56 sufficiently for the cam 55 thereon to effect the operations mentioned.

For periodically effecting vertical movement of the member 61, in timed relation to other operations of the apparatus, the lower end thereof is pivotally connected to one arm of a bell-crank 64 that is pivotally mounted at 65 upon the front wall of housing 10, the other arm of said bell-crank having its free end provided with a cam roller 66 that rides upon the perimeter of a cam 67 that is mounted upon the projecting front end of cam-and-crank shaft 11. A tension spring 68 is connected to one arm of the bell crank and to a fixed point on the housing 10 for urging cam roller 66 against cam 67. A tension spring 69 is connected to the other bell-crank arm and to member 61 in such a manner as to urge the hooked end of the latter toward the right as viewed in the drawings. Mounted in the upper end of member 61 is a rearwardly projecting headed stud 70 that engages a vertical guide plate 71 on the side of housing 10, the arrangement being such as to retain the slotted end of member 71

61 in proper position laterally while permitting it to move up and down. The major portion of cam 67 consists of a low portion upon which the cam roller 66 rides during the intervals that the form F is rotating. Said cam includes an elevated portion 67a of considerable extent that engages the cam roller during intervals that the form is stationary, after a bead core 19 has been wound thereon, to lower hook member 61 and thus to turn wrist plate 56, and cam 55 thereon, from the position shown in Fig. 5 to the position shown in Fig. 6. This causes angular movement of lever arm 25 so as to release the tape-end, the latter then being free to spring outwardly against the inner periphery of the bead core 19 by reason of its inherent resilience. As previously stated, the tape-releasing movement of the arm 25 also effects collapse of the form-segment 21, with the result that the finished bead core is readily ejected from the form by the ejector fingers 30.

The linear extent of the cam surface 67a is relatively short so that it passes out of engagement with the cam roller 66 while the form F is still stationary, with the result that the hook member 61 is caused to rise and thus to restore wrist plate 56 to the position shown in Figs. 1 and 5. This operation raises form segment 21 and also moves lever arm 25 angularly so as to grip the leading end of tape 16 which has been fed forward into recess 24. At the end of each bead-core-winding cycle the form F stops in the angular position shown in Fig. 1 to permit ejection of the finished bead core. Before the beginning of the next winding cycle, the form is turned angularly, in counter-clockwise direction, to the position shown in Fig. 2, to bring the recess 24 of the form into alignment with the tape-die 15. This movement of the form is relatively of the shaft 12, the arrangement being such that in the succeeding core-winding phase of operation, upon rotation of the shaft, there will be an interval of lost motion between the shaft and the form before the form is caused to rotate. Thus while the shaft makes an exact number of revolutions during each rotary phase of an operative cycle, the form F will be rotated to a slightly less extent by the shaft and therefore will draw onto itself slightly less of the tape 16, with the result that overlap of the ends of the latter, in the finished bead core 19, is reduced or entirely eliminated as desired.

For turning the form F angularly to provide lost motion as described, the invention utilizes the angular movement of the wrist plate 56 previously described. To this end the wrist plate has secured to the perimeter thereof a rectangular metal block 73 that projects forwardly therefrom in overlapping relation to a stud 74 that is secured to a radial extension 37c of the adapter 37, and projects rearwardly therefrom. In the outer end portion of block 73 is an adjustable contact screw 75, the arrangement being such that when wrist plate 56 is turned angularly, in counter-clockwise direction, relatively of shaft 12, screw 75 will engage stud 74 with the result that adapter 37 will be turned angularly from the position shown in Fig. 5 to the position shown in Fig. 6. The said angular movement of the adapter also turns the form F angularly, relatively of the driver plate 42, from the position shown in Fig. 1 to the position shown in Fig. 2, the slot 50 in the form enabling the latter to move relatively of the driving stud 49 of said driver plate.

Mounted upon stud 74 on the opposite side thereof from that engaged by contact screw 75, is a metal block 77. The adapter sleeve 39 is formed at its rear end with a radial arm 39a, the free end of which carries a forwardly extending stud 78, the latter being disposed the same distance from the axis of the shaft 12 as is stud 74. The side of stud 78 that faces stud 74 has mounted thereon a metal block 79, the arrangement being such that block 77 will abut block 79 when the adapter plate 37 is turned angularly by the action of member 61. The block 79 thus constitutes a stop that prevents over-run of the form when turned angularly as described. Blocks 77, 79 are formed with complemental offset portions that interlock with each other when the blocks are together, as clearly shown in Fig. 7, with the offset portion of block 77 behind the offset portion of block 79. The arrangement is such that when the elements are in the position shown in Fig. 7, the form F readily may be removed from the apparatus without disturbing the adapter 37, the latter being retained against axial movement by the interlocked blocks.

The operation of the apparatus is as follows. The form F is driven in the direction indicated by the arrows in Figs. 1 and 2 to draw a plurality of convolutions of the tape 16 onto the periphery of the form to produce the bead-core structure 19 thereon. As soon as the bead-core comprises the desired number of plies, which is accomplished by the shaft 12 making an exact number of revolutions, the form stops in the position shown in Fig. 1, and the blade 17 descends across the front of the die 15 and shears the tape 16, the outer end of the tape that is on the form springing toward the form as shown at 81, Fig. 1. Immediately after form F stops and the tape is severed, cam surface 67a engages cam roller 66 and thereby tilts the bell-crank 64 with the result that hook member 61 is moved downwardly from the position shown in Fig. 1 to the position shown in Fig. 2. In so moving the hooked upper end of member 61 engages stud 60 of wrist plate 56 and turns the latter angularly, relatively of the shaft 12 and form F, from the position shown in Fig. 5 to the position shown in Fig. 6. The immediate result of the said angular movement of the wrist plate 56 is to move the cam surface 55 relatively of the cam roller 54 so that the latter moves from the depression 55a of the cam onto the elevated surface thereof. This movement of cam roller 54 moves link 32 longitudinally, against the tension of spring 57, and rocks lever arm 25 so that roller 27 thereon moves away from form-segment 21 permitting spring 23 to collapse the form by moving said segment toward the major form structure, and pin 28 rises out of engagement with the tape-end in recess 24, thus enabling said tape-end to spring outwardly against the inner periphery of bead-core 19.

As the wrist plate 56 continues to move from the position shown in Fig. 5 to that shown in Fig. 6, the contact pin 75 of the wrist plate comes into engagement with the stud 74 of the adapter 37 and turns the latter angularly, relatively of the shaft 12 to the position shown in Fig. 6, in which position the block 77 on stud 74 engages stop-block 79 on the stud 78 carried by adapter sleeve 39. The said angular movement of the adapter also turns the form F, which moves, relatively of the driving plate 42 and driving stud 49, from the position shown in Fig. 1 to the position shown in Fig. 2. During this movement of the form the outer end of the tape on the form F is rolled down onto the bead-core 19 by the presser roller 18. Since there is no relative movement between the cam 55 and the form during this movement of the latter, the lever arm 25 remains in the position wherein the form segment 21 is collapsed and the tape-engaging pin 28 is in raised position as shown in Fig. 2. The driving stud 49 normally is at the left-hand end of the slot 50, as viewed in Figs. 5 and 6, so as to drive the form in counter-clockwise direction when the shaft 12 is rotating. After the form has moved angularly as described, the stud 49 is in the right-hand end of slot 50 to the end that when the shaft 12 subsequently rotates there will be an interval of lost motion wherein the form F remains stationary while the driving stud 49 is moving from the right-hand end of slot 50 to the left-hand end thereof, after which the stud provides driving connection between the driving plate 42 and the form for driving the latter.

Figure 3:
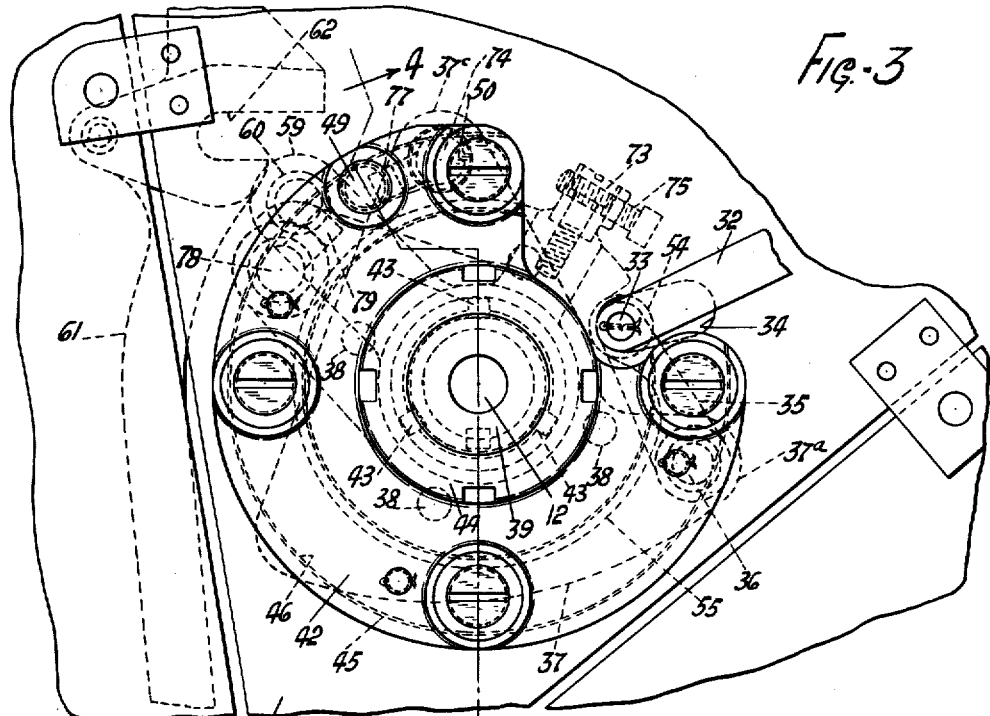
Figure 3 is a fragmentary detail, on a larger scale, of a portion of the structure shown in Fig. 1.
Figure 4:
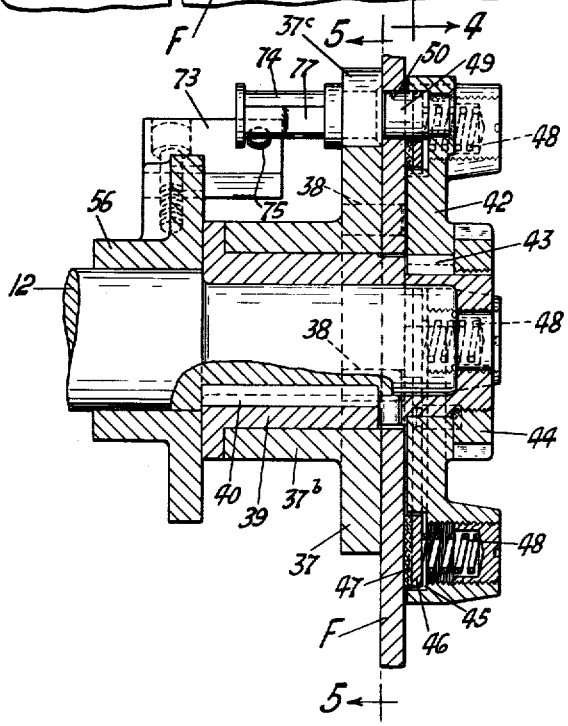
Figure 4 is a section on the line 4—4 of Fig. 3.

While the stud 74 and block 77 of the adapter 37 are firmly held between the contact pin 75 and block 79, as shown in Fig. 6, the ejector fingers 30 move across the perimeter of the form F and eject the bead-core 19 therefrom. Immediately thereafter suitable tape-feeding means (not shown) advances the tape 16 toward the form, the leading end of the tape entering recess 24 of the form, as will be understood by reference to my prior patent aforementioned. By this time the cam 67 has turned angularly a sufficient distance for the cam roller 66 to move off the elevated portion 67a thereof, whereupon tension spring 68 lifts the hook element 61 and restores it to the position shown in Figs. 1, 3 and 5, with the result that wrist plate 56 is restored to the position shown in the same figures, and the cam-roller 54 moves into depression 55a of cam 55 on said wrist plate. This swings lever arm 25 angularly so that its pin 28 grips the leading end of tape 16, within recess 24, and its roller 27 elevates form segment 21 into spaced relation to the major form structure. The shaft 12 then starts to rotate, but the form F momentarily remains stationary while the drive plate 42 turns relatively thereof, inertia and the retarding effect of the continuous tape 16 being sufficient to overcome the friction of the pressure plate 46. As soon as the lost motion of pin 49 in slot 50 is taken up, the form F is driven by said pin in counter-clockwise direction, to draw the tape 16 onto its perimeter. After the shaft 12 has made exactly a determinate number of revolutions, it comes to rest with the form in the angular position shown in Fig. 1. This completes a cycle of operation, which may be repeated indefinitely since all operations are automatically performed.

The invention enables the apparatus of the aforesaid patent to be utilized with relatively little alteration for the production of bead cores having little or no overlap of the tape-ends.

Modification may be resorted to without departing from the spirit of the invention, or the scope thereof as defined by the appended claims.

What is claimed is:

1. In apparatus for winding tire beads, the combination of a rotatable shaft operating in a cycle consisting of a rotative phase and a stationary phase, a generally circular form on which a tire bead is built carried by said shaft, a lost motion driving connection between said shaft and said form, and means operating in determinate time relation to the operating phases of said shaft for turning the form relatively of said shaft.

2. In apparatus for winding tire beads, the combination of a continuously rotating drive shaft, a rotatable shaft driven thereby and operating in a cycle consisting of a rotative phase and a stationary phase, a generally circular form on the periphery of which a tire bead is built, said form being carried by said shaft, driving connection between the shaft and the form, and means operated by the drive shaft for turning the form angularly on its axis, relatively of said driven shaft, during intervals when the latter is stationary.

3. In apparatus for winding tire beads, the combination of a continuously rotating drive shaft, a rotatable shaft driven thereby and operating in a cycle consisting of a rotative phase and a stationary phase, a generally circular tire-bead-building form carried by said driven shaft, a lost motion driving connection between said form and driven shaft, gripper means on the form for engaging the leading end of a tape from which the tire bead is built, a member journaled on the driven shaft, and means operated by the drive shaft for turning said member angularly relatively of the driven shaft when the latter is stationary, said member having operative connection with said gripper to operate the same, and having connection with the form for turning the latter angularly relatively of its shaft.

4. In apparatus for winding tire beads, the combination of a rotatable shaft operating in a cycle consisting of a rotative phase and a stationary phase, a generally circular bead building form journaled on said shaft and formed with a local arcuate slot concentric with said shaft, a driving plate fixed on said shaft, a pin carried by said driving plate and extending into said form-slot, for driving said form, and means for turning the form angularly relatively of said pin when the shaft is stationary.

5. In apparatus for winding tire beads, the combination of a rotatable shaft operating in a cycle consisting of a rotative phase and a stationary phase, an adapter sleeve keyed to said shaft, an adapter journaled on said sleeve, a generally circular bead building form carried by said adapter, a driving plate keyed to said sleeve and having lost motion driving connection with said form, and means for effecting angular movement of the adapter during the stationary phase of the shaft for turning the form angularly relatively of the driving plate.

6. A combination as defined in claim 5 in which the lost motion driving connection consists of a driving pin carried by the driving plate and projecting laterally into an arcuate slot in the form.

7. In apparatus for winding tire beads, the combination of a rotatable shaft operating in a cycle consisting of a rotative phase and a stationary phase, an adapter sleeve keyed to said shaft, an adapter journaled on said sleeve, a generally circular bead building form carried by said adapter, a driving plate fixed to said sleeve and having lost motion driving connection with said form, a wrist plate journaled on said shaft and provided with a lateral projection, means for turning said wrist plate angularly during the stationary phase of the shaft, and means on the adapter extending into the orbit of the lateral projection of the wrist plate whereby the adapter and form are turned angularly by the angular movement of the wrist plate.

8. In apparatus for winding tire beads, the combination of a rotatable shaft operating in a cycle consisting of a rotative phase and a stationary phase, an adapter sleeve keyed to said shaft, an adapter journaled on said sleeve, a generally circular bead building form carried by said adapter, a driving plate fixed to said sleeve and having lost motion driving connection with said form, a wrist plate journaled on said shaft and having a laterally projecting contact member, a stud on said adapter projecting into the orbit of the said contact member, means for turning the wrist plate angularly during the stationary phase of the shaft whereby the contact member engages the adapter stud and thus turns the adapter and form angularly relatively of the driving plate, and means carried by the adapter sleeve against which the adapter stud bears at the limit of said angular movement.

FLORAIN J. SHOOK.

CERTIFICATE OF CORRECTION.

Patent No. 2,151,306. March 21, 1939.

It is hereby certified that error appears in the above numbered patent requiring correction as follows: In the grant, and in the heading to the printed specification, name of inventor, for "Florian J. Shook" read Florain J. Shook; and that the said Letters Patent should be read with this correction therein that the same may conform to the record of the case in the Patent Office.

Signed and sealed this 16th day of May, A. D. 1939.

(Seal)

Henry Van Arsdale
Acting Commissioner of Patents.

tionary phase, an adapter sleeve keyed to said shaft, an adapter journaled on said sleeve, a generally circular bead building form carried by said adapter, a driving plate fixed to said sleeve and having lost motion driving connection with said form, a wrist plate journaled on said shaft and having a laterally projecting contact member, a stud on said adapter projecting into the orbit of the said contact member, means for turning the wrist plate angularly during the stationary phase of the shaft whereby the contact member engages the adapter stud and thus turns the adapter and form angularly relatively of the driving plate, and means carried by the adapter sleeve against which the adapter stud bears at the limit of said angular movement.

FLORAIN J. SHOOK.

CERTIFICATE OF CORRECTION.

Patent No. 2,151,306.   March 21, 1939.

It is hereby certified that error appears in the above numbered patent requiring correction as follows: In the grant, and in the heading to the printed specification, name of inventor, for "Florian J. Shook" read Florain J. Shook; and that the said Letters Patent should be read with this correction therein that the same may conform to the record of the case in the Patent Office.

Signed and sealed this 16th day of May, A. D. 1939.

(Seal)

Henry Van Arsdale
Acting Commissioner of Patents.